United States Patent [19]

Schwald

[11] Patent Number: 5,467,817
[45] Date of Patent: Nov. 21, 1995

[54] PACKING ELEMENT FOR METHODS OF EXCHANGE OR CONVERSION OF MATERIALS DESIGNED AS A HEAT-TRANSFER ELEMENT

[75] Inventor: Günther Schwald, München, Germany

[73] Assignee: Sulzer Chemtech AG, Winterthur, Switzerland

[21] Appl. No.: 213,201

[22] Filed: Mar. 14, 1994

[30] Foreign Application Priority Data

Mar. 25, 1993 [EP] European Pat. Off. ........... 93810218

[51] Int. Cl.⁶ ........................................ F28F 3/12
[52] U.S. Cl. ........................... 165/167; 165/170
[58] Field of Search ..................... 165/168, 170, 165/166, 167

[56] References Cited

U.S. PATENT DOCUMENTS

| | | | |
|---|---|---|---|
| 2,156,544 | 5/1939 | Raskin | 165/170 X |
| 3,216,495 | 11/1965 | Johnson | 165/166 |
| 3,364,992 | 1/1968 | Henry-Biabaud | 165/166 |
| 3,412,448 | 11/1968 | Landberg | 29/890.039 |
| 4,022,050 | 5/1977 | Davis et al. | 165/170 X |
| 4,099,928 | 7/1978 | Norback | 29/890.039 |
| 4,228,851 | 10/1980 | LaBarge et al. | 165/170 |
| 4,352,393 | 10/1982 | Vidal-Meza | 165/166 |
| 4,450,705 | 5/1984 | Vidal-Meza | 29/890.039 |
| 4,471,759 | 9/1984 | Anderson et al. | 165/170 X |
| 4,699,209 | 10/1987 | Thorogood | 165/110 |
| 5,121,792 | 6/1992 | Schukey | 165/166 |

FOREIGN PATENT DOCUMENTS

| | | |
|---|---|---|
| 0428265 | 5/1991 | European Pat. Off. . |
| 1232273 | 10/1960 | France ............ 165/170 |
| 2115348 | 7/1972 | France . |
| 82645 | 1/1952 | Germany . |
| 2047313 | 11/1980 | United Kingdom . |

Primary Examiner—Leonard R. Leo
Attorney, Agent, or Firm—Townsend and Townsend and Crew

[57] ABSTRACT

A heat-transfer element forms a packing element for material exchange or material conversion processes. The packing element has a plurality of parallel layers which extend in a main direction (15) of material flow and are formed by bodies (1) with hollow spaces (17) for a heat-transfer medium. Each of the heat-transfer bodies (1) has a pair of shells (1a, 1b) made from a foil-like material. The side surfaces of the shells are wave-shaped such that wave crests (141) are inclined with respect to the main direction (15) and that open flow channels crossing each other are provided between adjacent layers in mutual contact. The relief-like profiling of the shells (1a, 1b) provides a distribution and a collection channel system (121, 121') for the heat-transfer medium in addition to the heat-transfer channels (17). On the inner side of the shell pair a plurality of connection points may be made along the flow channels to form a connection which can withstand the excess pressure of the heat-transfer medium. The material of the shells (1a, 1b) is preferably a metal alloy and the profiling is made by pressing.

10 Claims, 4 Drawing Sheets

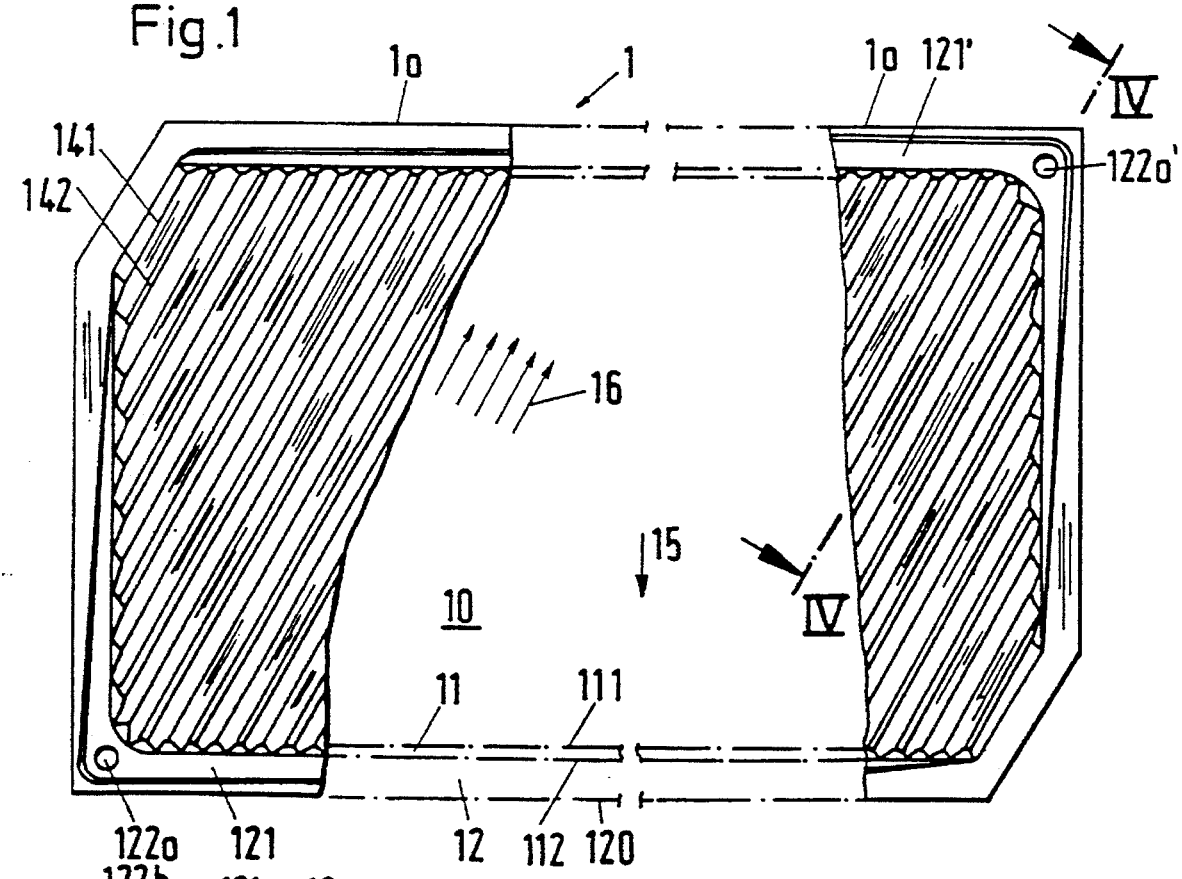
Fig. 1
Fig. 2
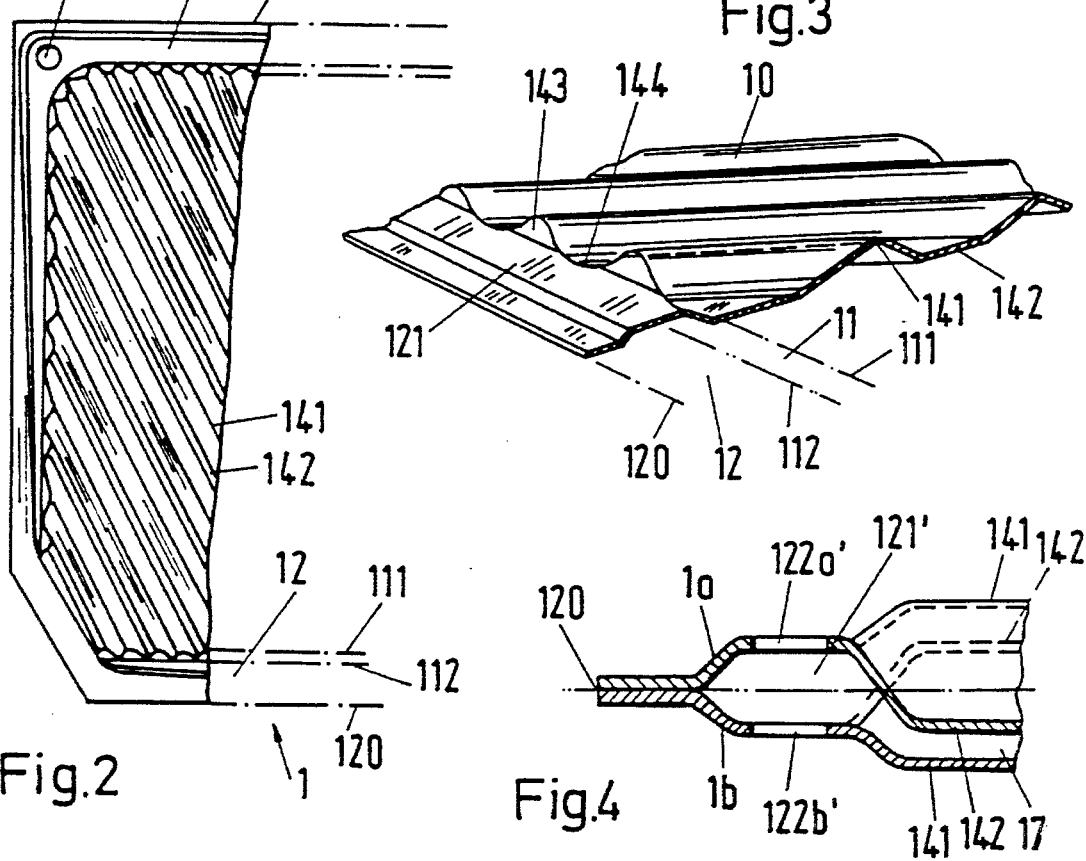
Fig. 3
Fig. 4

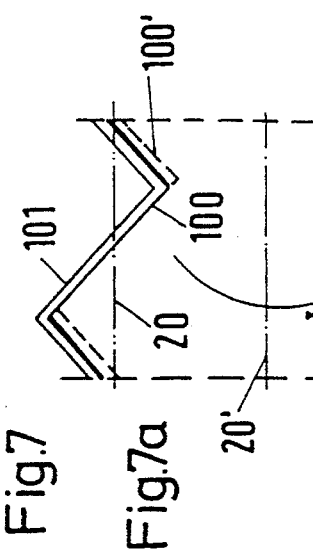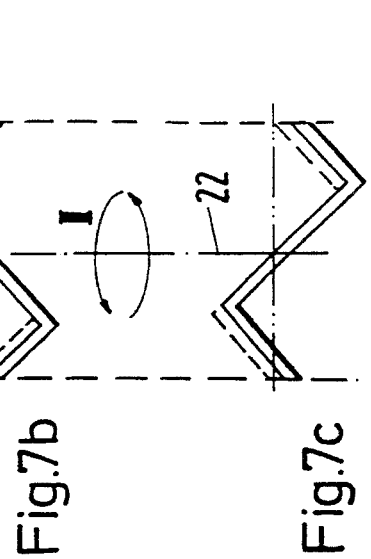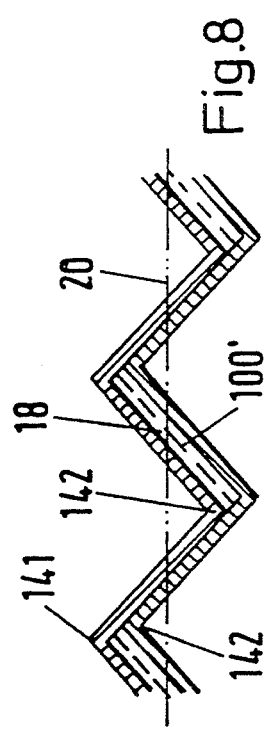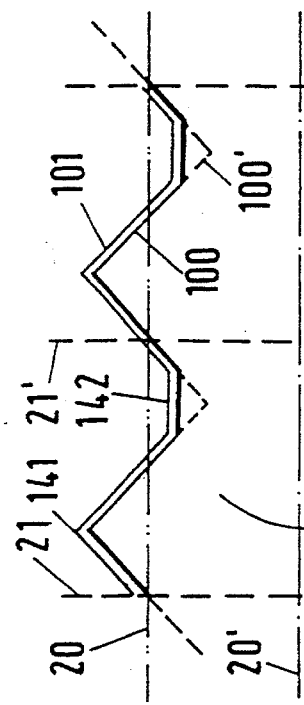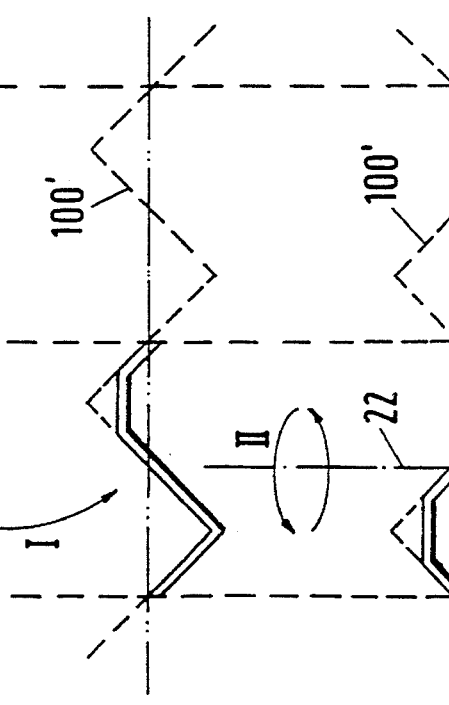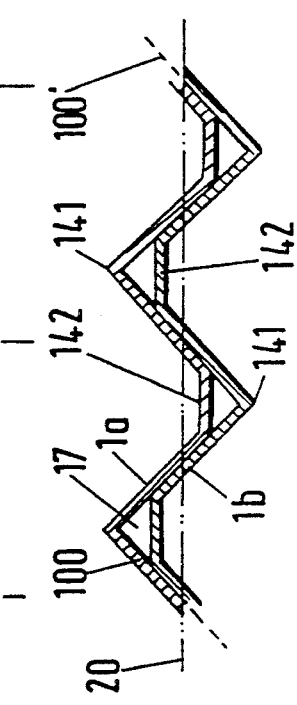

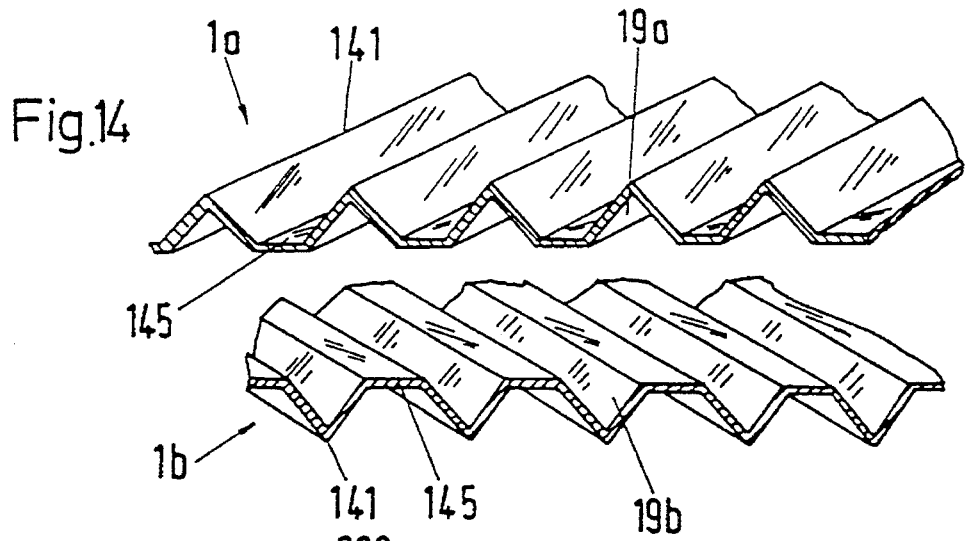
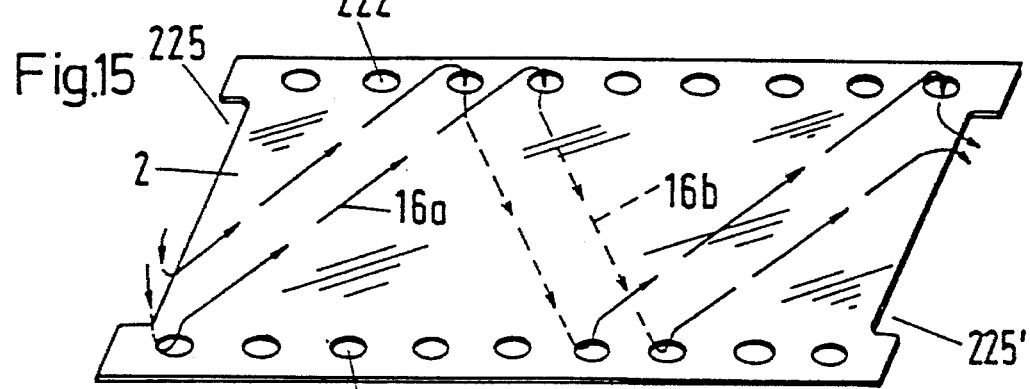
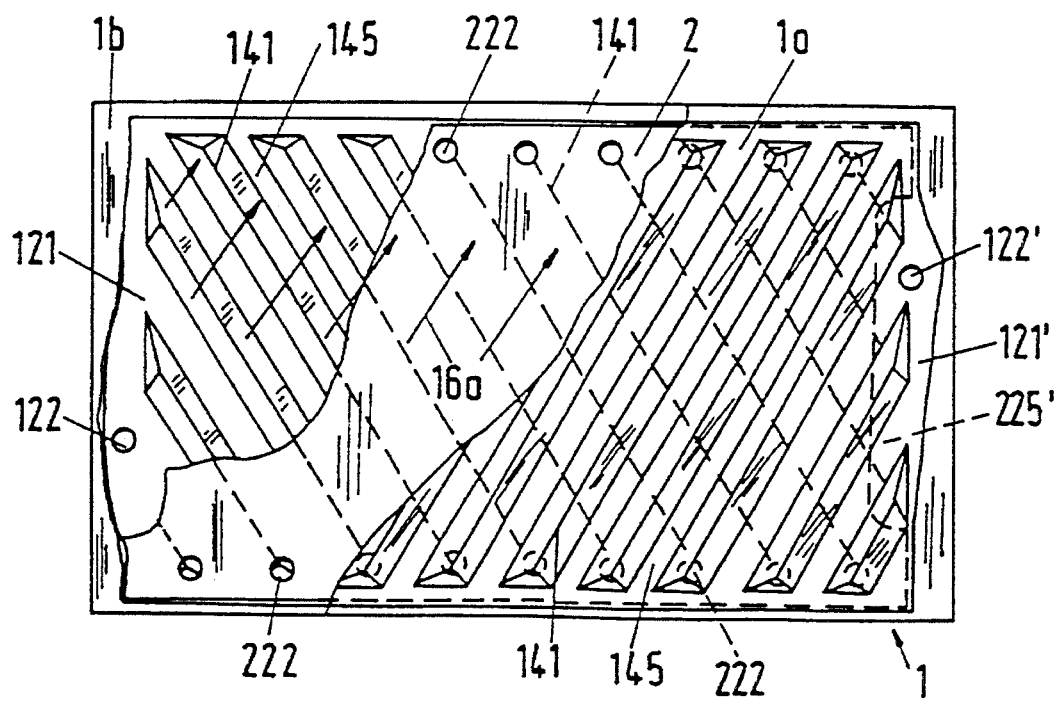

PACKING ELEMENT FOR METHODS OF EXCHANGE OR CONVERSION OF MATERIALS DESIGNED AS A HEAT-TRANSFER ELEMENT

BACKGROUND OF THE INVENTION

The invention relates to a packing element for the exchange or conversion of materials designed as a heat-transfer element. The invention also relates to the use of packing comprising such packing elements.

EP-A 0 391 846 discloses a fluidized bioretor comprising a heat-transfer device which has a packing designed as known, for instance, from material exchange columns or static mixers: one such packing is composed of layers of wave-shaped or zigzag folded lamellae, the profiling of the lamellae providing open channels crossing each other. A layer of the known heat-transfer device is formed by two identical, uniformly spaced lamellae. The hollow space between the two lamellae serves for the guiding of a heat-transfer medium.

In material exchange or conversion columns it is seemingly not known to make the packing elements as heat-transfer elements. For instance in a catalytic reactor (EP-A 0 433 222), in which the catalyzer body is made as a packing in the form of a static mixer, the material stream is so guided in the packing, that preferably a heat dissipation to the reactor results.

It is known (see G. Kaibel, "Energieintegration in der thermischen Verfahrenstechnik", Chem.-Ing. Tech. 68, p. 99–106, particularly FIG. 13), that, for instance, during the separation of a material mixture (methanol/water) energy losses may be reduced by intermediate evaporation. It is arranged so that this intermediate evaporation takes place outside the column. It would be more advantageous if this process step could be performed by a packing made as a heat-transfer element.

In a packing, which is suggested for the above mentioned fluidized bioreactor, various difficulties are encountered: both side surfaces in the form of corrugated foils or sheets require an expensive design as regards distribution and collection channels for the heat-transfer medium. Because the side surfaces are uniformly spaced from each other, controlled guiding of the heat-transfer medium is practically impossible. In addition, there are no provisions which would allow excessive pressure of the heat-transfer medium.

SUMMARY OF THE INVENTION

It is therefore the aim of the invention to devise a packing element of the initially mentioned kind, which would not suffer from the above mentioned difficulties. The heat-transfer bodies of the packing elements are produced by the pressing of metal foils.

In addition to separation processes and for catalysis or other material conversion processes, the packing element according to the invention may be advantageously used also for sorption processes which are associated with a relatively high energy turnover. A further possible application is for material separation by fractional crystallization. In this process, disclosed in Swiss patent 501 421, a melt is purified by solidification and periodical melting of crystal layers deposited in heat-transfer pipes.

BRIEF DESCRIPTION OF THE DRAWINGS

The invention will be explained with reference to drawings, in which:

FIG. 1 is a heat-transfer body of a packing element according to the invention in side elevation, FIG. 2 shows a second side of the body of FIG. 1, FIG. 3 shows a cut-out portion of a shell of the same body in perspective, FIG. 4 is a section along line IV—IV in FIG. 1, FIG. 5 shows three partial illustrations for the explanation of the term "inverse reflection", with reference to the inner region of a shell of a first embodiment, FIG. 6 is a cut-out cross-section of the inner region of the first embodiment, FIG. 7 shows the "inverse reflection" for a second embodiment, FIG. 8 is a cross-section for the second embodiment, corresponding to FIG. 6, FIG. 14 is a cut-out of a pair of shells with heat-transfer channels crossing each other, in an exploded view, FIG. 15 shows an intermediate layer, which may be provided for a pair of shells according to FIG. 14, and FIG. 16 shows a heat-transfer body with a pair of shells according to FIG. 14 and an intermediate layer according to FIG. 15.

DESCRIPTION OF THE PREFERRED EMBODIMENTS

Figure 9:
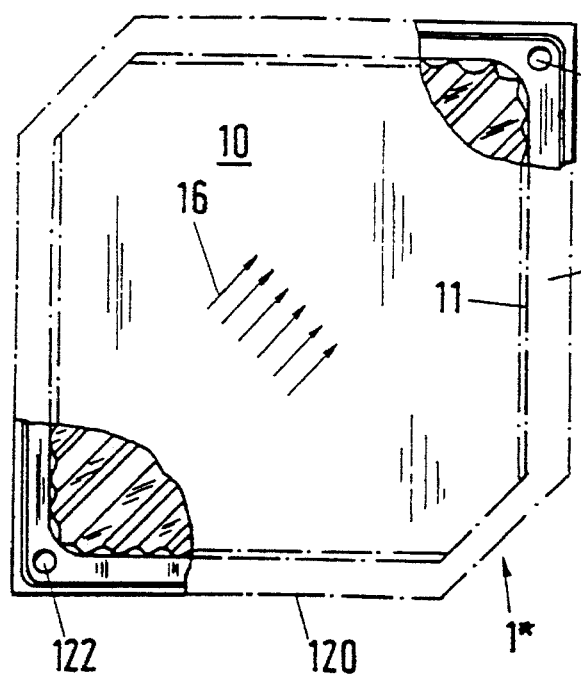
FIG. 9 is a side elevation of a special embodiment, in which both sides of the heat-transfer body have the same shape.

The shell 1a of the heat-transfer body 1 in FIG. 1 comprises a wave-shaped inner region 10, a border zone 12 and a transition zone 11. The borders of these zones are represented by dot-and-dash lines 111, 112 and 120; the line 120 is at the same time the shell border. The term "wave-shaped", when referring to the profile of the inner region 10, means here and hereinafter (and also in the claims) also "zigzag-shaped" "trapezial" and "saw-tooth shaped".

As is apparent from FIG. 6, the heat-transfer channels 17 are formed by the crests 141 and troughs 142 of the profile; the flow of the heat-transfer medium, corresponding to these channels 17, is indicated in FIG. 1 by arrows 16. The arrow 15 indicates the main direction of a material stream flowing between the bodies 1. Naturally, the main direction 15 of the material stream, and also the direction 16 of flow of the heat-transfer medium, may be reversed. The inner regions 10 have a saw-toothed profile in which the bottoms 142 of the wave troughs are planar so that the cross-sections of the heat-transfer channels 17 are triangular.

As is shown in FIG. 3, the wave-shaped crests 141 and the troughs 142 of the inner region are in the transition zones 11 closed by rising edges 143 and falling edges 144. In the border zone 12 is situated the distribution channel 121 of the heat-transfer medium and the collection channel 121' (see FIG. 1). For the feeding and discharge of the heat-transfer medium are provided openings 122a and 122a'.

The body 1 is formed by a pair of shells 1a, 1b. The second half 1b of the shell pair in FIG. 1 is shown, as a cut-out, in FIG. 2 (turned about the lower edge into the plane of the shell 1a). The border zones 12 of the shell pair are mirror images of each other, and the inner regions 10 have the shape of an "inverse mirror image" such that connection between the two shells is obtained. (The explanation of the term "inverse mirror image" will be hereinafter provided in connection with FIG. 5.) Provided is also a second opening 122b for the feeding of heat-transfer medium. FIG. 4 shows a cross-section of the shell pair 1a, 1b through the openings 122a' and 122b', which are provided for the discharge of the heat-transfer medium. The openings 122a' and 122b', and 122a and 122b, which are here situated in a corner, may instead be made in another part of the border zone 12.

FIG. 5a shows, in a cut-out, the inner outline 100 of the inner region 10 of the shell 1a and also its outer outline 101, the shell 1a having a saw-tooth profile. The outlines for the shell 1b are obtained by two transformation steps I and II. The step I is the reflection on the central plane 20. For the purpose of illustration the reflection in FIG. 5 is shown on a plane 20' which is parallel to plane 20. The result of the step I is shown in FIG. 5b. In step II the profile is turned in segments through 180° around axes 22, which are perpendicular to the central plane 20 (or is reflected on a plane through the axis 22). The profile segment is identical with the periodically appearing wave element, which is limited by the two lines 21 and 21'; the axis 22 passes through the center of the profile segment. The result of the step II is shown in FIG. 5c. The central line 100' lies on the initial line 100' in FIG. 5a. The transformation resulting from the combined steps I and II will be called "inverse refection".

The inner regions of the two shells 1a and 1b may be interconnected according to FIG. 6. The two shells 1a and 1b may be connected to each other on the contact areas of the inner outline 100, e.g. by spot welding.

FIGS. 7 and 8 show illustrations, corresponding to FIGS. 5 and 6, of the "inverse reflection" for a second embodiment, in which the profile is zigzag-shaped. Here, instead of two triangular channels 17, a rectangular channel 18 is produced.

FIG. 9 shows a particularly symmetrical variant 1* of the first embodiment in which the channel direction 16 extends at an angle of 45° to the edges 120. If the number of profile segments (as regards a diagonal section perpendicularly to the direction 16) is odd, the two shells 1a and 1b have the same shape and may therefore be made by the same pressing tool. A symmetrical variant is correspondingly provided also for the second embodiment (FIG. 8).

Figure 10:
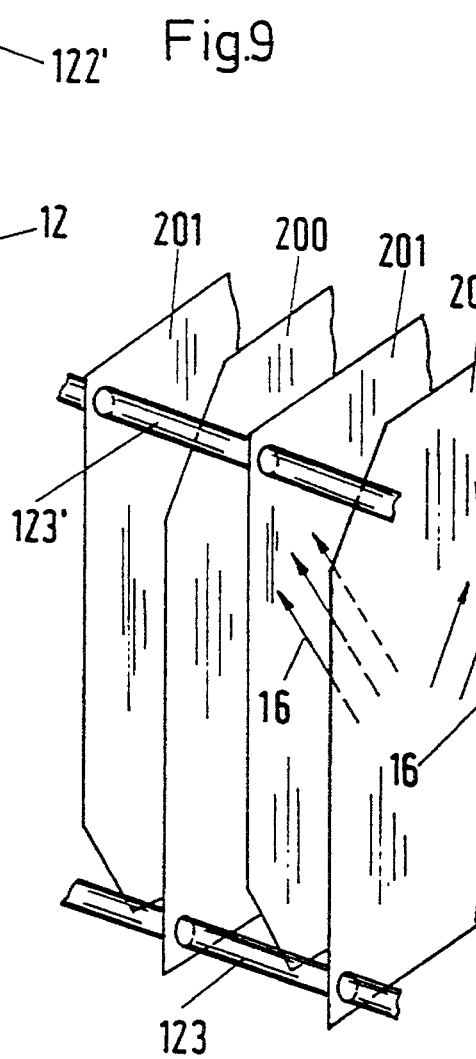
FIG. 10 shows a variant of the embodiment in FIG. 6.
Figure 11:
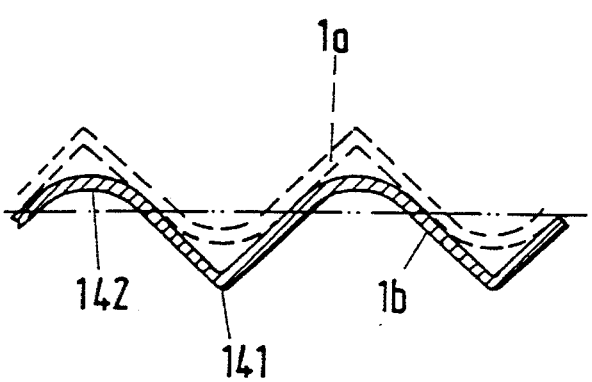
FIG. 11 shows a further embodiment.

FIG. 10 shows a variant of the profile of the first embodiment. Here the bottoms of the wave troughs are rounded rather than planar. In FIG. 11 is shown a more complex shell profile of the body 1 according to the invention for which the inner sides of the shells 1a and 1b may be to a high degree brought into contact with the heat-transfer medium.

Figure 12:
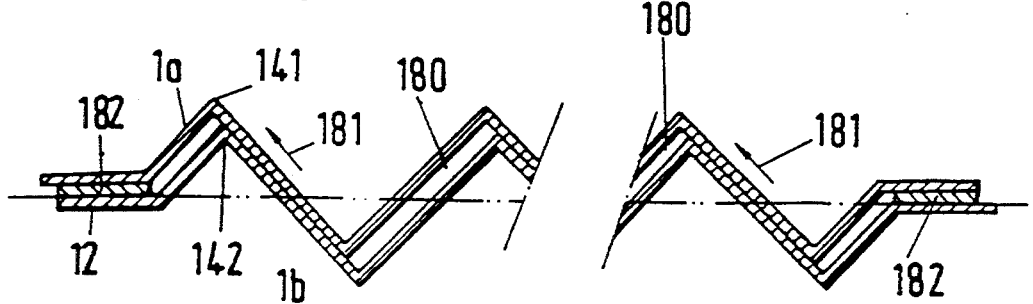
FIG. 12 shows a pair of shells in which the cross-sectional area of the heat-transfer channels is changeable.

The profile shown in FIG. 8 has the property that the cross-sectional areas of the channels 18 may be increased. For this purpose—see FIG. 12—a frame member 182 is inserted in the border zone 12, whereby the two halves of the shell pair 1a, 1b are moved apart in the direction of arrow 181 and channels having an increased width 180 are produced.

Figure 13:
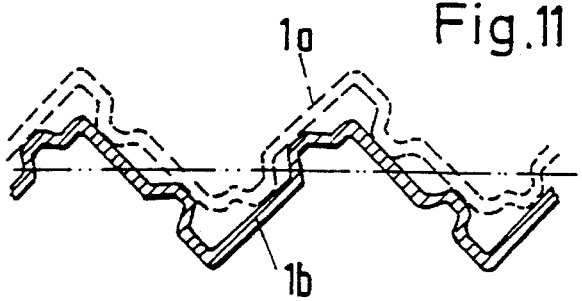
FIG. 13 is a representation of parallel connection of four adjacent heat-transfer bodies.

FIG. 13 shows, in a cut-out, the way in which the four heat-exchange bodies of a packing element according to the invention, which are depicted only by their central planes 200 and 201, are interconnected as in a plate heat-transfer element. The "bodies" 200 and 201 are arranged alternately is such a way that the directions of channels—indicated by arrows 16—cross each other. The duct 123 serves for feeding the heat-transfer medium to the "bodies" 200. The associated discharge ducts are not shown. The reverse applies to the alternately arranged "bodies" 201; here the duct 123' serves for discharging the heat-transfer medium. By the interconnection of the heat-transfer bodies to a packing element according to the invention are provided between the bodies the flow channels (not shown) in the shape of open channels which cross each other.

The two pieces of shells 1a and 1b shown in FIG. 14 provided a second type of the heat-transfer body. The inner regions of these shells 1a and 1b are congruent, i.e. have the same shape. They are saw-tooth shaped and have in the troughs between the crests 141 planar portions 145, on which the two shells may be interconnected. This creates—in the same way as in the flow channels—also for the heat-transfer medium, open channels 19a and 19b which cross each other. The channels 19a and 19b may be divided by an intermediate layer 2, as is shown in FIG. 15 (see also FIG. 16), into two communicating channel systems. Arrows 16a and 16b indicate the flow of the heat-transfer medium in two adjacent channels. In the openings 222 at the border the change of flow from one side to the other takes place. The recesses 225 and 225' ensure free connection to the distribution channel 121 and to the feeding opening 122 or collection channel 121' and discharging opening 122'.

If the central layer 2 is of metal, an improved heat transfer between the heat-transfer medium and the walls of the shells 1a and 1b is obtained. Both the shells 1a and 1b are, e.g., welded to the intermediate layer 2, so that a connection is established which withstands the excess pressure of the heat-transfer medium. Naturally—in contrast to the first type (see FIG. 13)—no alternating arrangement of the heat-transfer bodies 1 (according to FIG. 16) is needed for the packing element of the second type according to the invention.

What is claimed is:

1. A packing element for methods of exchange or conversion of materials designed as a heat-transfer element, the packing element comprising a plurality of parallel layers which extend in a main direction (15) of a material stream and are formed by bodies (1) with hollow heat transfer channels (17) for a heat-transfer medium, each of the heat-transfer bodies (1) having a pair of shells (1a, 1b) made of a foil material and having side surfaces with a wave-shaped profile forming wave crests (141) the shells further having a relief-type profiling which forms a distribution and a collection channel system (121, 121') for the heat-transfer medium, a plurality of connection points located along the flow channels on the inner side of the shell pair capable of withstanding excess pressure of the heat-transfer medium, each of the shells having a wave-shaped inner region (10), a border zone (12) and a transition zone (11) between the inner region and the border zone, the heat-transfer channels (17) being situated in the inner region, and the distribution and collection channel system (121, 121') being situated in the border zone, the border zones (12) of the shell pair being made as mirror images of each other, and the inner regions (10) being made as inverse mirror images such that connection is established between the two shells.

2. A packing element according to claim 1 wherein the material of the shells (1a, 1b) is a metal alloy and the profiling is made by pressing.

3. A packing element according to claim 1 wherein the heat-transfer bodies (1) are coupled to a packet by at least one feeding and one discharging duct (123, 123') for the heat-transfer medium.

4. A packing element according to claim 1 wherein the inner regions (10) are saw-tooth shaped so that bottoms (142) of the wave troughs are one of planar and rounded and so that cross-sections of the heat-transfer channels (17) are generally triangular.

5. A packing element according to claim 1 wherein the inner regions (10) are zigzag-shaped so that the cross-sections of the heat-transfer channels (17) are rectangular.

6. A packing element according to claim 1 wherein the heat-transfer bodies are coated with a catalytic material.

7. A packing element for methods of exchange or conversion of materials designed as a heat-transfer element, the packing element comprising a plurality of parallel layers which extend in a main direction (15) of a material stream and are formed by bodies (1) with hollow heat transfer channels (17) for a heat-transfer medium, each of the heat-transfer bodies (1) having a pair of shells (1a, 1b) made of a foil material and having side surfaces with a wave-shaped profile forming wave crests (141), the shells further having a relief-type profiling which forms a distribution and a collection channel system (121, 121') for the heat-transfer medium, a plurality of connection points located along the flow channels on the inner side of the shell pair capable of withstanding excess pressure of the heat-transfer medium, each of the shells having a wave-shaped inner region (10), a border zone (12) and a transition zone (11) between the inner region and the border zone, the heat-transfer channels (17) being situated in the inner region, and the distribution and collection channel system (121, 121') being situated in the border zone, the border zones (12) being mirror images of each other, and the inner regions (10) being congruent.

8. A packing element according to claim 7 including an intermediate layer in the inner region separating the shells of each pair of shells (1a, 1b).

9. A packing element according to claim 7 wherein the inner regions (10) are saw-tooth shaped so that bottoms (142) of the wave troughs are one of planar and rounded and so that cross-sections of the heat-transfer channels (17) are generally triangular.

10. A packing element according to claim 7 wherein the inner regions (10) are zigzag-shaped so that the cross-sections of the heat-transfer channels (17) are rectangular.

* * * * *